United States Patent
Dong et al.

(10) Patent No.: US 11,808,589 B1
(45) Date of Patent: Nov. 7, 2023

(54) DYNAMIC ALLOCATION OF RESOURCES USED IN DELIVERY

(71) Applicant: Staples, Inc., Framingham, MA (US)

(72) Inventors: Yuqian Dong, Southborough, MA (US); Girish Kulkarni, Cambridge, MA (US)

(73) Assignee: Staples, Inc., Framingham, MA (US)

( * ) Notice: Subject to any disclaimer, the term of this patent is extended or adjusted under 35 U.S.C. 154(b) by 620 days.

(21) Appl. No.: 16/404,028

(22) Filed: May 6, 2019

Related U.S. Application Data

(60) Provisional application No. 62/667,361, filed on May 4, 2018.

(51) Int. Cl.
*G01C 21/34* (2006.01)
*G06F 16/29* (2019.01)

(52) U.S. Cl.
CPC ........ *G01C 21/3453* (2013.01); *G01C 21/3446* (2013.01); *G06F 16/29* (2019.01)

(58) Field of Classification Search
None
See application file for complete search history.

(56) References Cited

U.S. PATENT DOCUMENTS

| | | | | |
|---|---|---|---|---|
| 2012/0271924 A1* | 10/2012 | Spitaels et al. | .... | H04L 29/1232 709/220 |
| 2016/0042320 A1* | 2/2016 | Dearing et al. | .. | G06Q 10/08355 705/338 |
| 2016/0258773 A1* | 9/2016 | Santilli et al. | ......... | G01C 21/36 |

OTHER PUBLICATIONS

"The Revolution of route and Schedule Optimization", https://optimoroute.com/features/, accessed Mar. 22, 2018, 3 pgs.
Haughton, Michael A., "Assigning Delivery Routes to Drivers Under Variable Customer Demands", Transportation Research Part E 43 (2007), Feb. 8, 2005, pgs. 157-172.
Kim et al., "A Multi Vehicle routing Algorithm for Package Delivery", Proceedings of the 7th WSEAS International Conference on neural Networks, Cavtat, Croatia, Jun. 12-14, 2006, pgs 132-138.
Prakash, Priyanka, "FedEx Routes for Sale: the Ultimate Guide", https://fitsmallbusiness.com/fedex-routes-for-sale/, Apr. 4, 2016, 11 pgs.
Routific, "FedEx Ground Operator Saves 17% in Net Operating Costs a Year", https://routific.com/stories/fedex-courier/, accessed Mar. 22, 2018, 7 pgs.
Yang et al., "Real-Time Multivehicle Truckload Pickup and Delivery Problems", Transportation Science, Vol. 38, No. 2, May 2004, pgs. 135-148.

\* cited by examiner

*Primary Examiner* — Aniss Chad
*Assistant Examiner* — Mahmoud M Kazimi
(74) *Attorney, Agent, or Firm* — VLP Law Group LLP; Michel Bohn

(57) ABSTRACT

A system and method for dynamic allocation of delivery resources is described. In an example implementation, the system may determine floating and static geographic areas based on delivery data, generate an initial mapping associating the static geographic area with addresses and/or routes, and generate one or more periodic routes based on the initial mapping. In some instances, the system may compute a route-value target for each of the periodic routes based on a load of the periodic routes and may then assign one or more floating addresses located in the one or more geographic regions to the periodic routes based on the route-value target. In some instances, the system may determine a delivery vehicle load plan based on the assignment to the routes and may automatically perform a defined operation using the delivery vehicle load plan.

18 Claims, 8 Drawing Sheets

DYNAMIC ALLOCATION OF RESOURCES USED IN DELIVERY

BACKGROUND

This application relates to systems and methods for balancing loads in delivery routing.

Some current delivery routing systems use fully fixed territory to route mapping in which addresses are assigned to routes on a daily basis. While these systems allow familiarity of drivers to specific areas, they do not allow for flexibility to accommodate volume fluctuations, nor do they provide a balanced load to the routes.

Frequently, these previous solutions either do not accommodate for the complexity of routing among many addresses or their algorithms only function in very limited circumstances. For instance, previous delivery routing systems use optimization-based algorithms that search for a distribution of addresses, calculate paths among the addresses, and then, in some instances, determine a compensation level for drivers in the routes. However, these approaches are computationally inefficient and do not balance load among the routes, especially when a volume of deliveries varies from day to day. Further, these previous solutions are scalable for varying delivery volume, especially for markets with many routes or addresses, and may require excessive processing time.

SUMMARY

Various innovative aspects, including systems, methods, interfaces, and other implementations, for dynamic allocation of resources used in delivery, are described. In some implementations, a method may include determining, by a computing device, one or more floating geographic areas from a set of geographic areas based on delivery data, the one or more floating geographic areas including one or more floating addresses located in the one or more floating geographic areas; generating, by the computing device, an initial static territory-route mapping associating one or more static geographic areas with one or more addresses in the one or more static geographic areas; generating, by the computing device, one or more periodic routes based on the initial static territory-route mapping; computing, by the computing device, a route-value target for each of the one or more periodic routes based on a load value of each of the one or more periodic routes; assigning, by the computing device, a first floating address of the one or more floating addresses to a first route of the one or more periodic routes based on the route-value target of the first route, the first floating address being located in the one or more floating geographic areas; and generating, by the computing device, a delivery vehicle load plan based on one or more periodic routes and the assignment of the first floating address to the first route.

Implementations may include one or more of the following features. The computer-implemented method further including: automatically performing, by the computing device, a defined operation based on the delivery vehicle load plan, the defined operation including one or more of generating a graphical interface illustrating a map of the one or more periodic routes, transmitting a message to a client device of a delivery driver, and dispatching an automated guided vehicle to execute operations based on the delivery vehicle load plan. The computer-implemented method where the initial static territory-route mapping is generated for a certain time period, the one or more static geographic areas being static over the certain time period, and a periodicity of the one or more periodic routes is a subdivision of the certain time period. The computer-implemented method further including: minimizing, by the computing device, a total number of routes in the one or more periodic routes based on a total demand of deliveries in the one or more periodic routes. The computer-implemented method further including: determining, by the computing device, a high-touch address from among the one or more floating addresses based on attributes of the high-touch address; and assigning, by the computing device, the high-touch address to a second route of the one or more periodic routes. The computer-implemented method where the route-value target for each route in the one or more periodic routes is based on a delivery volume and a driving distance for each route. The computer-implemented method where each of the set of geographic areas corresponds to a zip code. The computer-implemented method where generating the one or more periodic routes based on the initial static territory-route mapping includes running a vehicle routing problem solver to compute a particular route among addresses in a particular static geographic area of the one or more static geographic areas. The computer-implemented method where computing the route-value target for each of the one or more periodic routes is based on a distance traveled in the particular route among the addresses in the particular static geographic area. The computer-implemented method where assigning the first floating address to the first route is further based on a route value of the first route and includes determining the route value of the first route based on a scheduled time used for deliveries assigned to the first route.

Another general aspect may include a computer-implemented method including: determining, by a computing device, a set of floating geographic areas with one or more floating addresses located in the set of floating geographic areas; generating, by the computing device, an initial static territory-route mapping that associates a static geographic area with an address in the static geographic area; generating, by the computing device, a set of periodic routes based on the initial static territory-route mapping; determining, by the computing device, a high-touch address from among the one or more floating addresses based on attributes of the high-touch address; assigning, by the computing device, the high-touch address to a first route of the set of periodic routes; computing, by the computing device, a route-value for at least one of the set of periodic routes; assigning, by the computing device, a particular floating address of the one or more floating addresses to a second route of the set of periodic routes based on the route-value of the second route; and performing, by the computing device, a defined operation based on the set of periodic routes, the assignment of the high-touch address to the first route, and the assignment of the particular floating address to the second route.

Other implementations of one or more of these aspects include corresponding systems, apparatus, and computer programs, configured to perform the actions of the methods, encoded on computer storage devices.

The technology provides a routing solution that is flexible, robust, scalable, and more computationally efficient than solutions described in the Background, for example. The also provides a balanced and adaptable load across routes, as described below. It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DESCRIPTION

Figure 1A:
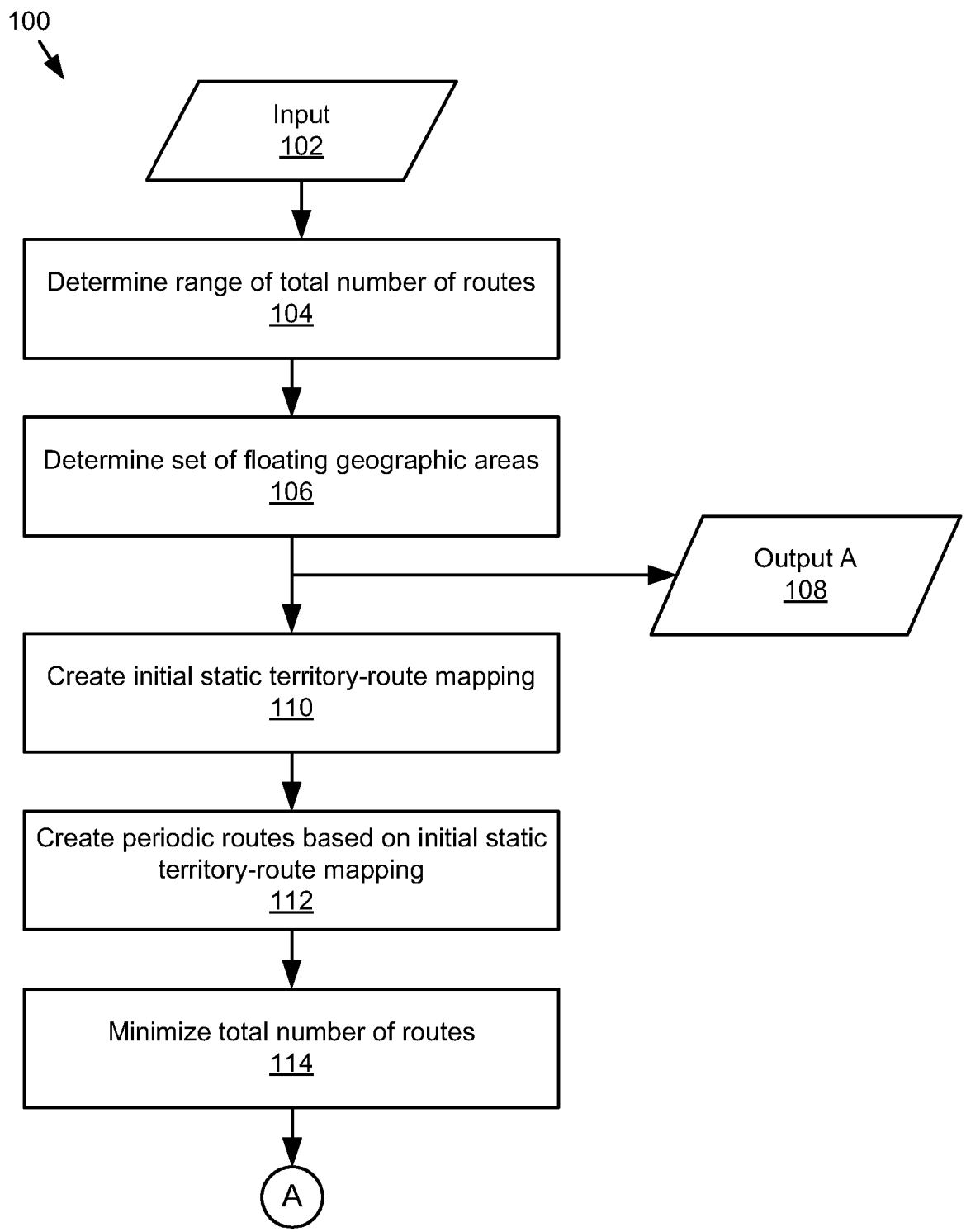
FIGS. 1A and 1B are a flowchart of an example method for allocating distribution resources.

The present application generally relates to technology that advantageously improves efficiency in last mile delivery. For example, the technology can improve the process of transporting parcels associated with an address order from a delivery depot (one of the intermediate nodes in the delivery network of a transportation carrier) to an address of a customer.

In some implementations, the technology combines one or more of territory planning, driver delivery area affinity, load balancing among routes, driver compensation (e.g., which may be calculated based on computed route values), and destination to route assignment for multi-vehicle, multi-stop, last mile parcel delivery. For instance, the technology may develop a routing of multiple vehicles (e.g., in real time) in order to complete the delivery of parcels to multiple destinations and to minimize the transportation cost, which may be incurred in unbalanced route loads, and to ensure that delivery location, driver, and vehicle constraints, such as capacity and cost, are satisfied.

The technology improves upon the existing approaches, at least, because it addresses a highly constrained multivehicle multi-stop parcel delivery problem, determine the number of routes and the sequence of stops for each route, create a flexible territory plan to ensure driver familiarity and absorb demand fluctuations, and/or, at the same time, create a fair workload for routes. In some instances, the technology may automate the process of planning and executing parcel delivery operations and hence significantly reduces the time and the manual effort required to do territory and balanced load planning. It also develops efficient routes reducing the time and resources consumed in a delivery operation and improving the service provided to addresses.

As described in the Background, previous solutions may be broken down in to separate sequential steps in which addresses are clustered, routes are assigned to the clusters, and then value of those routes is determined, but these solutions leave unbalanced routes that do not adapt well to changing volume. In some implementations, the technology described herein addresses these issues by performing operations described below, such as integrating the operations of assigning, route planning, load balancing, and route value determination. In some implementations, these operations may be performed and their inputs, outputs, and changes may be data mined in real time or near real time, which leads to planning and execution efficiency.

The technology described herein may us the combination of measures to produce load plans, routes, and target route values for various routes. Some implementations of technology use heuristics-based operations to improve computational efficiency over previous solutions, such as those described in the Background.

Further, the technology described herein can scale to various delivery volumes and quantities of routes efficiently, thereby reducing consumed computational resources (e.g., processing time, power, memory, etc.), for example, at scale. For example, while the optimization-based algorithms of previous solutions provide accurate route assignment at small scales, previous solutions do not scale computationally to markets where dozens or hundreds of routes may be required, for instance, because computers get bogged down in the large quantity of calculations, which may increase exponentially with scale increase, required by the previous solutions.

Some implementations of the technology described herein separate a large territory (e.g., where multiple routes may be used) into smaller territories, which allows the system to focus on individual, smaller territories, which, among other operations may reduce the scale of the computational problem into smaller problems that can be performed more computationally efficiently, such as described in reference to FIGS. 1-5 herein.

Some implementations of the technology described herein are robust and flexible, allowing the technology to handle varying delivery volume, special situations, and exceptions.

In some implementations, the methods described herein may include training operations, fitting operations, tuning operations, data processing operations, and balancing operations. In some implementations, training operations may include initializing driver or cluster mapping using an average day or other time period. In some implementations, fitting operations may include obtaining dynamic routing for each specific-day to determine the total number of drivers or routes required, and fitting specific-day volume to the initial driver mapping obtained from the initialization. In some implementations, tuning operations may include dissipating routes (e.g., one at a time) to their nearby drivers until the total number of drivers is reduced to the number determined in the fitting operations, reassign multiple-driver covered geographic areas to one driver or route, and assigning high-touch addresses that are within a central floating region to drivers so that a high-touch address may be consistently assigned to the same driver.

In some implementations, the data processing operations may include, based on the static routing situations, as well as the remaining capacity of each route or vehicle, determining a route value target of each route, and using LP (e.g., linear programming) optimization to determine the fixed route value per route as well as a variable route value per carton and/or delivery. In some implementations, the balancing operations may include assigning floating volume of cartons to be delivered to routes in a way that attempts to hit a route value target and, at the same time, minimizes a total delivery cost for the floating volume. In some instances, the operations may include using a delivery time calculated by a vehicle routing problem (VRP) solver and/or an estimated delivery time calculated by a distance to balance the volume and/or load for each route and vehicle. A route value target may be used to coordinate dispatch of delivery vehicles, robots, etc., and/or may be used, for example, with a multiplier to determine pay or compensation provided to drivers of the routes, depending on the implementation. These and other operations and methods are described in further detail elsewhere herein.

In some implementations, the technology may estimate the number of routes used to deliver a set of orders to a set of addresses, develop value or load targets for each route, build delivery territories for each route, assign daily orders to routes in way that minimizes the daily cost of delivery, ensure that the routes meet a weekly route value target, ensure that a significant part of the route covers an area familiar to the driver, does not exceed the on worked hours (e.g., a combination of driving time, service time, reloading time, etc.) for the driver, and/or ensure that the orders carried by the driver does not exceed the capacity of the truck, and/or provide other features described herein.

The technology disclosed herein includes computing systems, methods, user interfaces, data, and other aspects that generate a plan for delivery operations for a certain delivery period (e.g., a subsequent set of days). Some implementations of the technologies may provide a delivery execution plan in real time that provide low delivery cost, high delivery service level, high route to territory familiarization, dedicated service for high-touch addresses (e.g., by consistently serving a high-touch address by the same route), a flexibility and capacity buffer to accommodate volume fluctuations, balanced load distribution across routes, routes that meet a minimum route value target, and/or low territory overlapping/crossover between routes, which may facilitate driver recruitment and minimize conflict among routes.

The features and advantages described herein are not all-inclusive and many additional features and advantages will be apparent to one or ordinary skill in the art in view of the figures and description. Also, it should be noted that the language used in the specification has been selected for readability and instructional purposes and not to limit the scope of the inventive subject matter.

For the purposes of description herein, certain notations may be used, including:
  i The $i^{th}$ specific day or other period within the delivery period
  j The $j^{th}$ route
  l Lower bound
  h Higher bound
  g Target
  sch Scheduled
  f Floating
  r Remaining
  Δ Gap
  VC Vehicle Capacity
  T Working time
  OT Overtime or excess scheduled working time
  R Route
  N Number of Routes
  CpC Delivery Cost per box
  P Route value
  V Volume of deliveries, addresses, or cartons to be delivered For the purposes of this description, an average day may include, for example, an aggregated one-day representation of a delivery period. It should be noted that although the term "day" is used herein, the delivery period may include a different term or periodicity. The average day may include an 8 hour period, 24 hour period, a work shift, or another increment. In some implementations, the average day may be obtained for each address that has a delivery within the delivery week (or other delivery period, etc.), for example, by summing the volume and then dividing the aggregated volume by the total number of delivery days within the delivery period.

It should also be noted that although zip codes are described, other geographical areas, territories, cities, subdivisions, etc., may be used and are contemplated in the technology described herein.

With reference to the figures, reference numbers may be used to refer to components found in any of the figures, regardless whether those reference numbers are shown in the figure being described. Further, where a reference number includes a letter referring to one of multiple similar components (e.g., component 000a, 000b, and 000n), the reference number may be used without the letter to refer to one or all of the similar components.

Figure 1B:
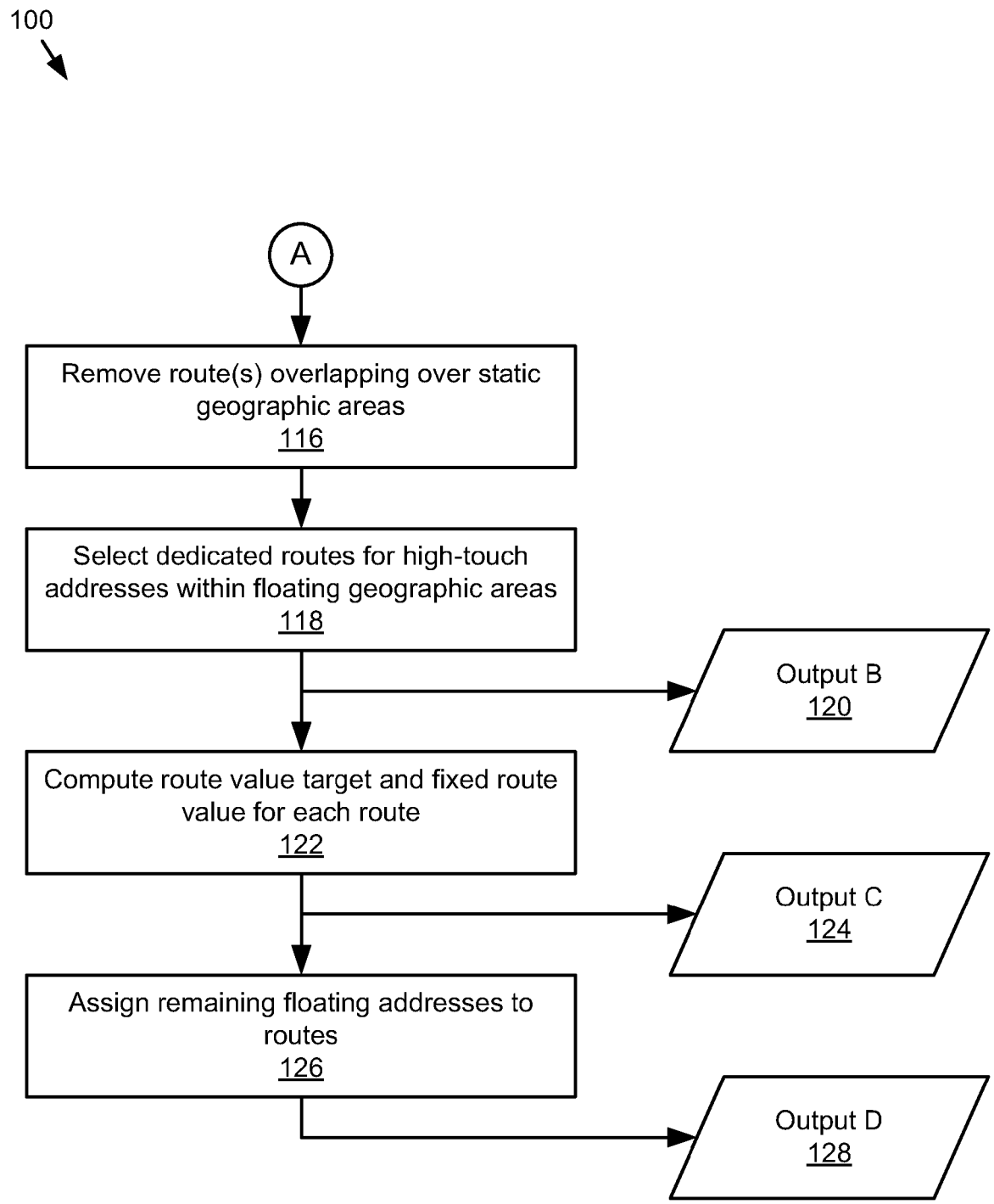

FIGS. 1A-1B illustrates an example method 100 for dynamically allocating distribution resources, for example, by generating a route load plan for delivery operations for a delivery period. At 102, the route balancing engine 636 may receive input, which may include delivery data identifying a set of addresses in a set of geographic areas, each of which may be associated with a delivery. For example, the input may include a location of a delivery depot, locations of customer addresses, geographic IDs of addresses, latitude and longitude coordinates, zip codes, geographic areas, maps, delivery volume, volume of cartons in a particular delivery, order details, vehicle details, whether an address is a high-touch address, etc.

In some implementations, the route balancing engine 636 may receive as input, for example, one or more of: volume to be delivered within the delivery period; delivery depot address and delivery destination addresses; driver time matrix between addresses; service (stop) time used at each delivery destination address; scheduled daily scheduled time per route $T^{sch}$; scheduled daily overtime time per route $OT^{sch}$; maximum scheduled daily scheduled time per route $(T^{sch})^h = T^{sch} + OT^{sch}$; vehicle capacity VC; a vehicle routing problem (VRP) solver; range of route daily route value target; and/or minimum delivery cost of a box $CpC^l$.

At 104, the route balancing engine 636 may determine the range of the total number of routes. For example, the route balancing engine 636 may determine the time used to deliver to the addresses, sum this volume over addresses, and divide the aggregated volume by a total number of delivery days in a delivery period. In some instances, for each specific day within the delivery period, the route balancing engine 636 may run a vehicle route problem (VRP) algorithm to minimize the number of vehicles needed under the maximum scheduled daily scheduled working time constraint (referred to as $(T^{sch})^h$ constraint) and the vehicle capacity constraint (referred to as the VC constraint). For each specific day, the route balancing engine 636 may count the total number of routes $N_i$. The route balancing engine 636 may then take the average and the maximum of $\{N_i\}$, thereby setting the range of the total number of routes $[N^l, N^h]$, which will be used in the operation at 112, although it should be noted that other operations are possible At 106, the route balancing engine 636 may determine a set of floating geographic areas. For example, the route balancing engine 636 may determine one or more floating geographic areas from a set based on the delivery data. In some implementations, the route balancing engine 636 may divide a total number of routes between static and floating geographic areas. For example, the route balancing engine 636 may reserve a defined quantity of geographic areas as floating geographic areas with the rest of the geographic areas remaining as static geographic areas and statically mapped to routes. The floating geographic areas may include one or more floating addresses. In some instances, a static territory-route mapping is a mapping in which the assignment between delivery addresses and routes is static (e.g., does not change over the delivery days in the certain delivery time period). For example, addresses in a static geographic area may be statically assigned to a route over a delivery period, but addresses in floating zip codes can be assigned to any of the routes at various sub-increments of the delivery period, although this may be subject to exclusions, as described below. For example, a particular floating address may be restricted to being assigned to a particular route, with a particular static geographic area, or may be restricted from being assigned to a particular route or with a particular static geographic area.

The selection of floating geographic areas may be based on criteria including, for example, driving time to the delivery depot, total volume of addresses in the geographic areas in territory, driver preferences, vehicle capacity, etc. For example, the selected floating geographic areas are high in volume and/or in the order of importance. Additionally, if the daily volume of a particular geographic area is too large to be handled by a single route (e.g., based on a route value, vehicle capacity, maximum quantity of deliveries, etc.), then such a geographic area may be set as a floating geographic area, for example, to more readily split its addresses among other routes. In some implementations, the route balancing engine 636 may use other criteria when determining the floating geographic areas. For example, the route balancing engine 636 may additionally or alternatively select floating geographic areas based on the proximity of the areas to a dispatch center or delivery depot from which delivery vehicles may retrieve cartons for delivery. Similarly, the route balancing engine 636 may use other constraints such as driver preferences, type of geographic area (e.g., rural, urban, industrial, etc.), or other geographic area attributes.

The total quantity of floating geographic areas (e.g., among the total number of routes) may be set to be large enough to be effective as to balance load among routes. The area covered by floating geographic areas (e.g., a number of floating geographic areas) may be controlled to ensure high driver familiarization to routes. For example, depending on the implementation, the selected floating geographic areas may cover approximately 5-10% of the entire delivery area, account for approximately 20-30% of the total delivery volume, and/or may be within approximately 15-20 miles of driving distance to the delivery depot, although other implementations are possible.

In some implementations, the route balancing engine 636 may determine static and/or floating geographic areas based on a historical volume of orders within the geographic areas (which may be pre-set, as in zip codes, or dynamically determined for a territory) or based on real-time deliveries to be made in a delivery period. In some implementations, if there is no historical volume within a particular geographic area, the route balancing engine 636, may set the particular geographic area as a floating geographic area.

At 108, the route balancing engine 636 may output, for example, a territory plan, which may include an identification of one or more static and/or floating delivery areas. The plan may be used in the other operations described herein, such as at 110 below.

At 110, the route balancing engine 636 may create an initial static territory-route mapping, which may associate one or more static geographic areas of the set of geographic areas with one or more addresses in the one or more static geographic areas. In some instances, the initial static territory-route mapping may be generated for a certain time period (e.g., a periodicity of the one or more periodic routes is a sub-division of the certain time period, such as a day within a weeklong delivery period)

In some implementations, the route balancing engine 636 may run the VRP algorithm for the average day situation, without taking the volume within the floating geographic areas into consideration, and may minimize the number of vehicles needed under the maximum daily scheduled time $T^h$ constraint and the vehicle capacity constraint, where, $T^h = (T^{sch})^h - T^{pad}$, and $T^{pad}$ is a daily scheduled time padding (e.g., to allow volume within floating zip codes to be assigned to the routes at a later operation), which may be initially (e.g., when the VRP at 110 is run for the first time) may be set to 0 and, in some instances, may be incremented upward or downward, so that the floating geographic area volume can be assigned, for example. For instance, the scheduled time padding may be generated using a computer learning module trained using floating and static geographic areas and delivery volume over time. These operations may provide an initial territory-route mapping on an address level for the addresses within the static geographic areas. For the purposes of this description, the total number of routes determined at this step may be referred to as $N^a$. If $N^a < N^l$, then the route balancing engine 636 may increase the scheduled time padding gradually and rerun the VRP for the average day situation until $N^a \geq N^l$.

In some implementations, the route balancing engine 636 may create an initial static territory-route mapping based on a historical volume of orders within various geographic areas or based on real-time deliveries to be made in a delivery period.

At 112, the route balancing engine 636 may create one or more periodic (e.g., daily, weekly, monthly, etc.) routes based on the initial static territory-route mapping. For example, each specific day, based on the initial static territory-route mapping, the volume from the static geographic areas may be split into $N^a$ routes. For each split, the route balancing engine 636 may run the VRP algorithm (e.g., including compute a particular route among addresses in a particular static geographic area) to minimize the total scheduled time, taking into consideration vehicle capacity (e.g., quantity of cartons that may be transported by the vehicle). The route balancing engine 636 may then store, in a storage device, the routing result, for example.

In some implementations, the route balancing engine 636 may create the initial routing based on defined constraints, which may include driver references, administrative preferences, customer preferences, proximity of geographic areas to other areas in a route or delivery depot, etc. In some implementations, the route balancing engine 636 may receive inputs from an administrator selecting specific geographic areas to be assigned to particular routes and the route balancing engine 636 may calculate the remaining mapping subject to this constraint.

In some implementations, the constraints may include that if a route includes multiple geographic areas, they be connected or within a defined distance from each other. For example, the route balancing engine 636 may determine an adjacency matrix for the geographic areas. The adjacency matrix may indicate which geographic areas are adjacent to one another and the route balancing engine 636 may use the adjacency matrix to constrain the mapping such that geographic areas assigned to a particular route touch on one or more sides.

In some implementations, at 114, the route balancing engine 636 may minimize or otherwise reduce the total number of routes, for example, among the one or more periodic routes based on a total demand of deliveries in the one or more periodic routes. An example implementation of minimizing the total number of routes is described in reference to FIG. 2. For example, in some implementations, in response to $N^a = N^l$ (e.g., as described above), the route balancing engine 636 may proceed to 116 in FIG. 1B. In some implementations, in response to $N^a > N^l$, the route balancing engine 636 may perform some or all of the operations of the method 200 illustrated in FIG. 2.

Figure 2:
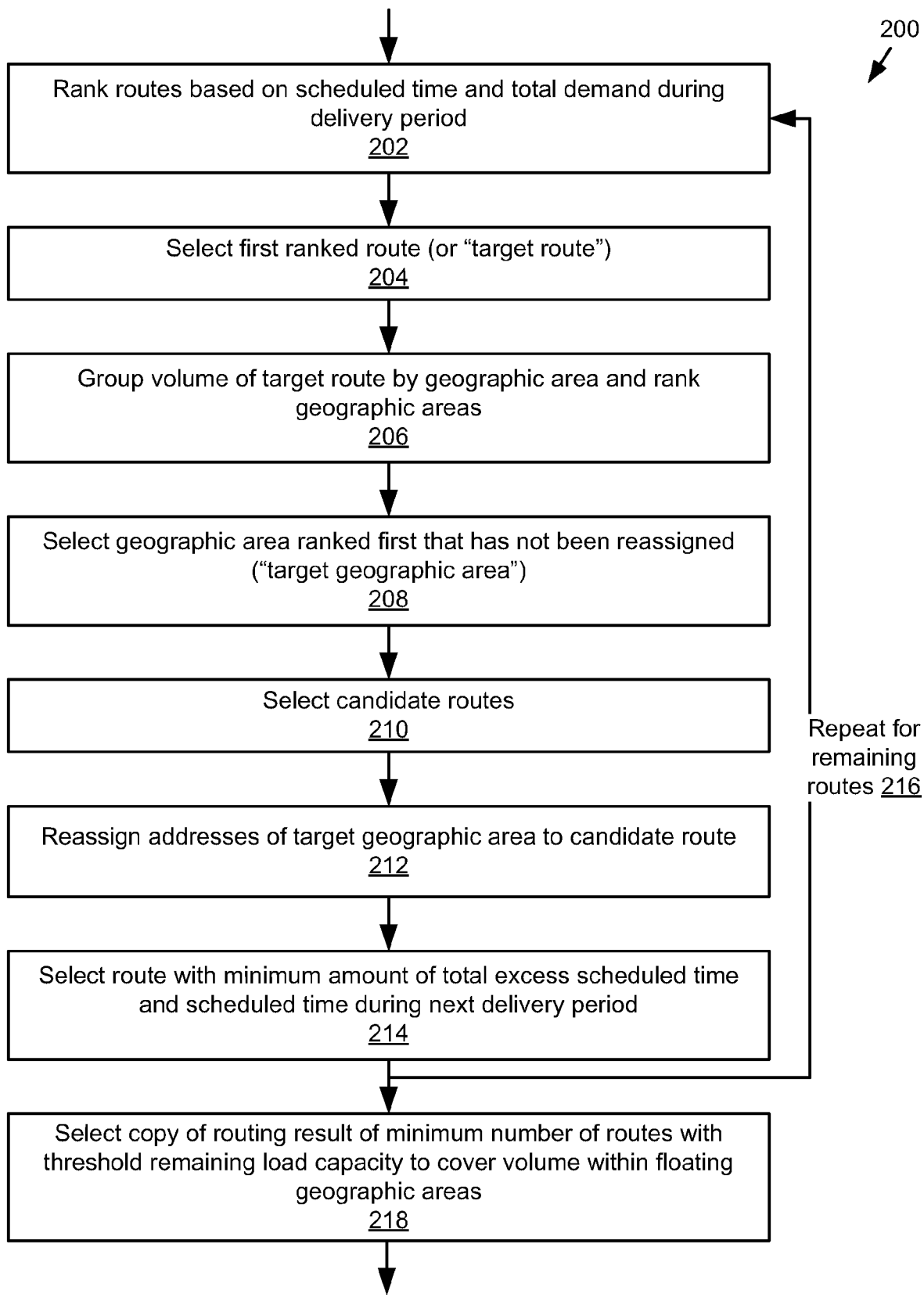
FIG. 2 is a flowchart of an example method for minimizing a total number of routes.
Figure 3:
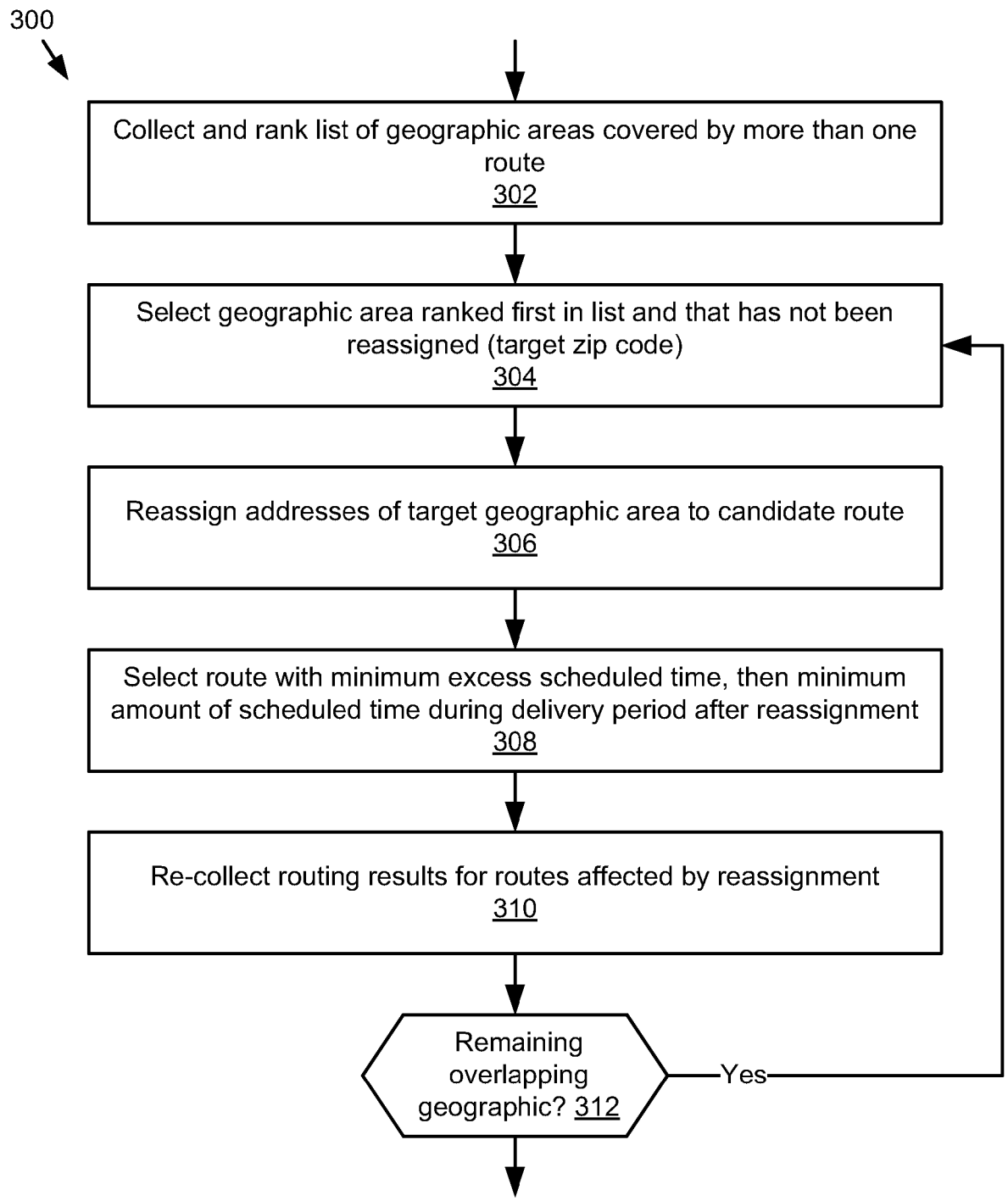
FIG. 3 is a flowchart of an example method for removing routes overlapping over static geographic areas.
Figure 4:
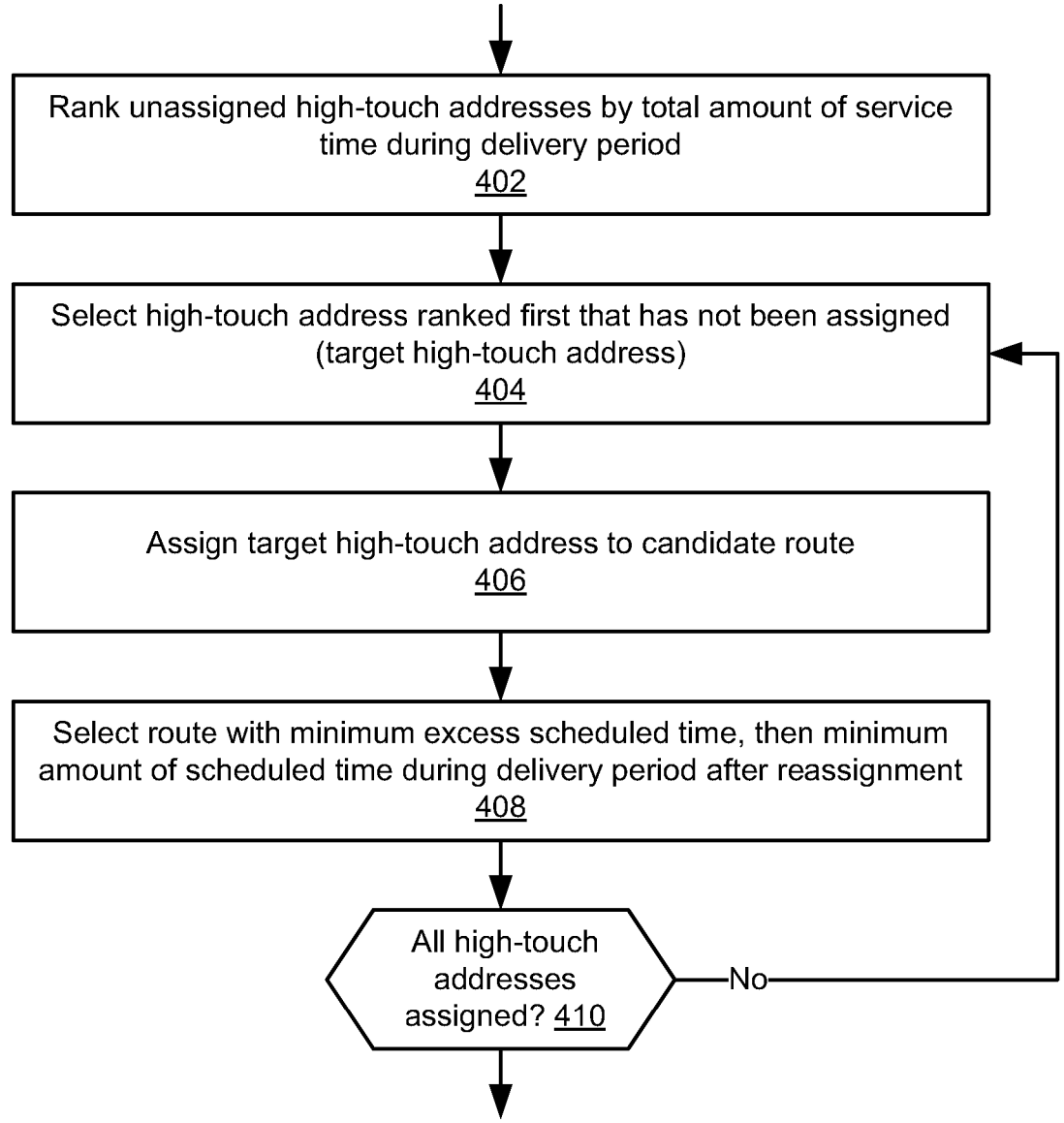
FIG. 4 is a flowchart of an example method for assigning high-touch floating addresses to specific routes.

Referring to FIG. 2, at 202, the route balancing engine 636 may rank routes by one or more of the total amount of scheduled time and total demand during the delivery period. In some implementations, the route balancing engine 636 may rank the total amount of scheduled time during the delivery period, then by the total demand during the delivery period (e.g., both of which may be ranked in ascending order). At 204, the route balancing engine 636 may select the route ranked first, which may be referred to as the target route for processing in the method 200.

At 206, the route balancing engine 636 may group the volume (e.g., by orders, distance traveled, or another unit of measure) of the target route by geographic area and may rank the geographic areas. For example, the route balancing engine 636 may rank the geographic areas by the total amount of scheduled time covered by the target route during the delivery period (e.g., in descending order).

At 208, the route balancing engine 636 may select the geographic area ranked first from the ranking at 206, which may be performed subject to the constraint that the geographic area has not been reassigned to a different route or position in the ranking. This geographic area may be referred herein to as the target geographic area.

At 210, the route balancing engine 636 may select candidate routes for continued processing. For example, if the target geographic area has volume covered by other routes within any specific day, the route balancing engine 636 may find a set of such routes, which may be referred to herein as candidate routes.

At 212, the route balancing engine 636 may reassign addresses of the target geographic area to a candidate route. For instance, if the target geographic area is covered only by the target route during the delivery period, the route balancing engine 636 may find the set of such routes that have assigned delivery addresses geographically adjacent to the target geographic area. These routes may be selected as candidate routes for continued processing.

At 214, the route balancing engine 636 may select the route with the minimum amount of total excess scheduled time or overtime ($OT_j = \sum_i OT_{ij}$) and the minimum amount of scheduled time ($T_j = \sum_i T_{ij}$) during the delivery period after reassignment, where $$OT_{ij} = T_{ij} - T_{ij}^{sch}.$$

In some instances, the route balancing engine 636 may take the addresses of the target geographic area, reassign them to one of the candidate routes, and select the route.

In some implementations, the route balancing engine 636 may re-collect routing results for the routes that are affected by the reassignment at 214 and repeat 206-214 until the geographic areas touched and/or covered by the target route are reassigned.

At 216, the route balancing engine 636 may repeat one or more of the operations of the method 200 (e.g., 206, 208, 210, 212, and/or 214) for the remaining routes. For instance, the route balancing engine 636 may maintain in memory a copy of the routing result if $N \leq N^h$ and may repeat operations of the method 200, until the number of total routes $N = N^l$.

At 218, the route balancing engine 636 may select the stored copy of the routing result of a minimum number of routes with the threshold remaining load capacity to cover the volume within the floating geographic areas. For example, the route balancing engine 636 may select the copy of routing result with enough remaining load capacity to cover the volume within the floating geographic area(s).

Returning to the method 100 illustrated in FIG. 1B, at 116, the route balancing engine 636 may remove route(s) overlapping over static geographic areas. An example implementation of a method 300 for removing route(s) overlapping over static geographic areas is described in reference to FIG. 3. For example, in some implementations, in response there being no static geographic area covered by more than one route during the delivery period, the method 100 may continue to 120. In some implementations, in response to there being at least one static geographic area covered by more than one route during the delivery period, the route balancing engine 636 may perform some or all of the operations of the method 300 illustrated in FIG. 3.

At 302, the route balancing engine 636 may collect a list of geographic areas covered by more than one route and may rank those geographic areas by the number of covering routes during the delivery period (e.g., in ascending order), and by the total amount of service time during the delivery period (e.g., in descending order).

At 304, the route balancing engine 636 may select the geographic area that is ranked first in the list and that is has not been reassigned for further processing. This geographic area may be referred to as a target geographic area and the routes covering this geographic area as the candidate routes in reference to the method 300.

At 306, the route balancing engine 636 may reassign the addresses of the target geographic area to a candidate route. For instance, at 308, the route balancing engine 636 may select the route with the minimum amount of total excess scheduled time or overtime ($OT_j = \sum_i OT_{ij}$), then the minimum amount of scheduled time ($T_j = \sum_i T_{ij}$) during the delivery period after reassignment.

At 310, the route balancing engine 636 may re-collect routing results for the routes that are affected by the reassignment at 306-308, and, at 312, the route balancing engine 636 may repeat one or more of the operations of the method 300 (e.g., 304, 306, and/or 308) until no geographic area has an overlapping route.

Returning to the method 100 illustrated in FIG. 1B, at 118, the route balancing engine 636 may select dedicated routes for high-touch addresses within floating geographic areas. For instance, the operation at 118 may assign high-touch addresses within the floating geographic areas to one of the routes so that during the delivery period, a high-touch address is consistently (e.g., always, a threshold percentage of a set, etc.) served by the same route during the delivery period. In some implementations, the route balancing engine 636 may determine a high-touch address from among the one or more floating addresses based on attributes of the high-touch address (e.g., an administrator setting, a complaint record, a typical order volume, a type of location, etc.). A high-touch address may be assigned to a particular route of the one or more periodic routes determined above and removed from the set of floating addresses. An example implementation of a method 400 for selecting dedicated routes for high-touch addresses within floating geographic areas is described in reference to FIG. 4.

At 402, the route balancing engine 636 may rank the unassigned high-touch addresses by the total amount of service time during the delivery period (e.g., in descending order).

At 404, the route balancing engine 636 may select the high-touch address ranked first and that has not been assigned for continued processing. The selected high-touch address may be referred to as the target high-touch address in reference to the method 400.

At 406, the route balancing engine 636 may assign the target high-touch address to a route selected from some or all of the routes. For instance, at 408, the route balancing engine 636 may select a route with the minimum amount of total excess scheduled time ($OT_j = \sum_i OT_{ij}$), and/or the minimum amount of scheduled time ($T_j = \sum_i T_{ij}$) during the delivery period after assignment. In some instances, the route balancing engine 636 may assign the target high-touch address to the selected route.

At 410, the route balancing engine 636 may repeat one or more of the operations of the method 400 (e.g., 404, 406, and/or 408) until all high-touch addresses are assigned.

In some implementations, at 410 the route balancing engine 636 may determine that each high-touch addresses are statically assigned to a consistent route for the duration of the delivery period (e.g., multiple daily deliveries, as described above).

Returning to FIG. 1B, at 120, the route balancing engine 636 may output, for example, a total number of routes and/or a territory plan (e.g., a plan depicting the route assignments, etc.). In some instances, the territory plan may include an assignment of one or more static delivery areas to routes. The route balancing engine 636 may generate a graphical interface based on the output at 120 depicting the total number of routes and/or territory plan. The output at 120 may also be used in the other operations, such as at 122.

At 122, the route balancing engine 636 may compute a route value target and fixed route value for each route, for example, using a balanced delivery vehicle load plan. In some implementations, a balanced load plan may include a route-specific daily route value target, route-specific daily fixed route value, and universal delivery cost per carton. This design provides flexibility to ensure a fair, delivery focused, and driver-attractive balanced load plan and yet maintains low overall cost.

In some implementations, the route balancing engine 636 may compute a route-value target for each of the one or more periodic routes based on a load value of each of the one or more periodic routes. For example, a load value may be a value representing, a schedule time, delivery volume, driving distance, or other workload factor for each route. For instance, the route balancing engine 636 may compute the route-value and/or route value target for each of the one or more periodic routes based on a distance traveled in the particular route among the addresses in the particular static geographic area (which may include assigned high-touch addresses).

In some implementations, when determining the route value and route value target, the route balancing engine 636 may use the routing result obtained from the operation at 118, $$\{R_{ij}\}_7,$$

to calculate the remaining scheduled time of each route within each specific day (or other time period)

$$T_{ij}^r \left( T_{ij}^r = \max\left( T^{sch} - T_{ij}, 0 \right) \right).$$

The route balancing engine 636 may assign the unassigned floating volume $$V_i^f$$

within specific day i to routes based on $$T_{ij}^r,$$

using $$V_{ij}^f = V_i^f * \frac{T_{ij}^r}{\Sigma_j T_{ij}^r}.$$

In some implementations, the route balancing engine 636 may sum up the volume statically assigned a route $$V_{ij}^s$$

and $$V_{ij}^f$$

to estimate the total volume assigned to route j within specific day i and hence the total volume assigned to route j during the delivery period $$\left( V_{ij}^t = V_{ij}^s + V_{ij}^f; V_j^t = \Sigma_i V_{ij}^t \right).$$

In some instances, the route balancing engine 636 may determine route specified daily route value targets $$\{P_j^g\}$$

in a way that the $$\{P_j^g\}$$

monotonically increases with $$\{V_j^t\}$$

by interpolating $$\{V_j^t\}$$

between the range of the daily route value target

In some implementations, the route balancing engine 636 may next solve the following linear program (LP) problem with decision variables $$\{P_j^f\}$$

and CpC:
Minimize:

$$\Sigma_j \left( P_j^f * \max(i) + CpC * V_j^t \right)$$

Subject to:

$$CpC \geq CpC^l$$

$$P_j^f * \max(i) + CpC * V_j^t \geq P_j^g, \forall j$$

$$P_j^f \geq 0, \forall j$$

Based on these operations, the route balancing engine 636 may have three components, $$\{P_j^g\},$$

$$\{P_j^f\},$$

and CpC, of a balanced load plan, and may use these components, at 126, to assign floating volume to routes.

Returning to FIG. 1B, at 124, the route balancing engine 636 may output, for example, a balanced load plan and/or a compensation plan by route and/or a balanced load plan based on fixed and variable fees with route specific target(s). In some implementations, the route balancing engine 636 may also calculate a compensation plan as part of the balanced load plan. For instance, the compensation plan may include compensation values determined using the route values of the balanced load plan. For example, the route balancing engine 636 may multiply the route value(s) by a defined scalar or perform another operation to determine a compensation. The output at 124 may be output in a graphical user interface and/or may be used in other operations of the method 100, such as at 126.

At 126, the route balancing engine 636 may assign the remaining floating addresses to routes. In some implementations, the route balancing engine 636 may assign a given floating address to a route of the one or more periodic routes based on the route-value target of the route, for example, based on how close the route value (e.g., calculated, as described in the example above) of the route is to its route-value target. For example, the route-value target may indicate a particular target scheduled time and the route value may indicate a scheduled time for the route, and the route balancing engine 636 may evaluate how adding the floating address to the route would affect this ratio and assign the floating address based on this determination.

In some implementations, the floating address may be assigned based on a proximity to geographic areas (and/or addresses in the areas) already assigned to the route. For example, in some implementations addresses in a floating geographic area 1 may only be assigned to the nearby routes 1-4, and floating geographic area 2 may only be assigned to the nearby routes 5-8. Accordingly, in some instances, a specific floating geographic area and/or address may be restricted to a specific set of routes.

Figure 5:
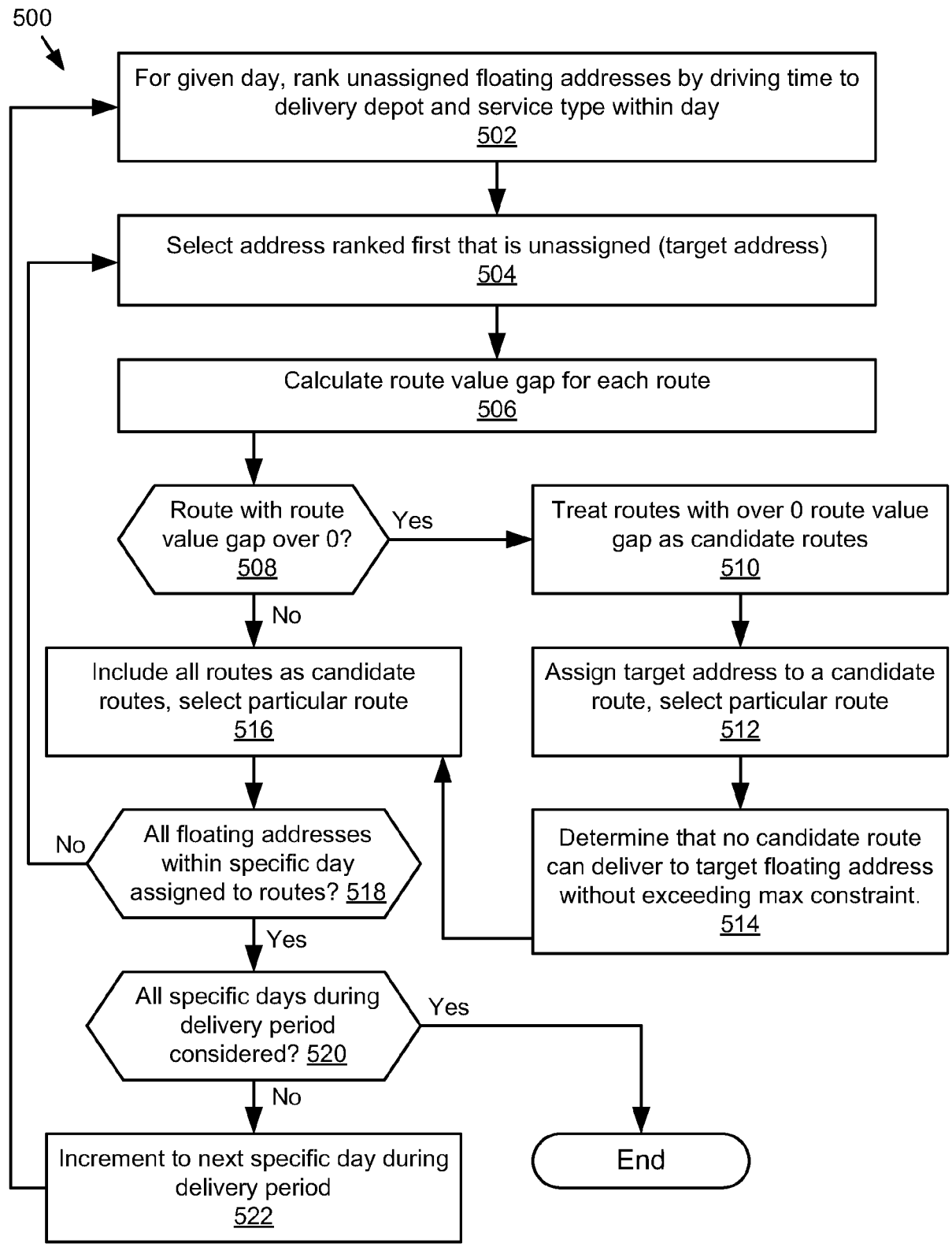
FIG. 5 is a flowchart of an example method for assigning floating addresses to routes.

An example implementation of a method 500 for assigning the remaining floating addresses to routes is described in reference to FIG. 5.

At 502, the route balancing engine 636 may, for specific day i, rank the unassigned floating addresses by driving time to the delivery depot (e.g., in ascending order), and/or by the service time within specific day i (e.g., in descending order).

At 504, the route balancing engine 636 may select the address that is ranked first and that is unassigned for further processing, which may be referred to as the target address.

At 506, the route balancing engine 636 may calculate the route value gap $$P_j^\Delta$$

for each route, for example, using:

$$P_j^\Delta = P_j^g * i - CpC * V_j^i - P_j^f * i,$$

where, $$V_j^i$$

is the volume assigned to route j until specific day i, including specific day i.

At 508, the route balancing engine 636 may determine whether there is a route with a route value gap over 0, and, at 510, the route balancing engine 636 may treat routes with route value gaps over 0 as candidate routes for further processing. For example, if there is any route with $$P_j^\Delta > 0,$$

such routes may be referred to as the candidate routes in reference to the method 500.

At 512, the route balancing engine 636 may assign a target address to a candidate route. For example, the route balancing engine 636 may assign the target address to a candidate route selected based on which route has the minimum amount of scheduled time in specific day i after the assignment. It should be noted that, in some implementations, the minimum amount of scheduled time may be constrained to not exceed the maximum scheduled daily scheduled time, $(T^{sch})^h$.

At 514, the route balancing engine 636 may determine whether no candidate route can deliver to target floating address without exceeding the max scheduled time constraint and, at 516, the route balancing engine 636 may include all routes as candidate routes and select a particular route based on another defined condition. In some implementations, if no candidate route can deliver to the target floating address without exceeding the maximum scheduled daily scheduled time constraint, $(T^{sch})^h$, then the route balancing engine 636 may include all the routes as the candidate routes and may select the route that has the minimum amount of scheduled time in specific day i after the assignment (e.g., including the assignment).

In some implementations, if there is no route with $P_j^\Delta > 0,$ the route balancing engine 636 may include all the routes as the candidate routes and may select the route that has the minimum amount of scheduled time in specific day i after the assignment.

At 518, the route balancing engine 636 may determine whether all floating addresses within the specific day have been assigned to routes. For example, the route balancing engine 636 may repeat some or all of the operations of method 500 (e.g., 504- 516) until the floating addresses within the specific day i have been assigned to routes.

At 520, the route balancing engine 636 may determine whether all specific days during a delivery period have been considered and, at 522, the route balancing engine 636 may increment to the next specific day (or other period) during the delivery period. For example, the route balancing engine 636 may repeat some or all of the operations of the method 500 (e.g., 502-516) for the next specific day until all the specific days during the delivery period have been considered.

Returning to FIG. 1B, at 128, the route balancing engine 636 may output, for example, a delivery vehicle load plan by route (e.g., including a number of miles/ distance traveled and a total scheduled time), an assignment of some or all destinations to route, a sequence of destinations for each route, compensation per route, route values per route, etc. In some implementations, the route balancing engine 636 may assign distribution resources based on the load plan(s). For instance, the route balancing engine 636 may allocate routes, drivers, deliveries, etc., as described herein.

In some implementations, the route balancing engine 636 may generate a balanced load plan, for example, as described above based on the periodic routes and assignment of the floating addresses to the routes.

In some implementations, the route balancing engine 636 may automatically perform one or more operations based on the balanced load plan, the assignment of addresses to routes, etc.

In some implementations, the route balancing engine 636 may generate a graphical user interface illustrating a map of the one or more periodic routes, a map of the one or more static or geographic areas, and/or various route, address, and assignment data, such as a route value, a route-value target, a total number of miles driven, a total number of scheduled hours, where each of the scheduled hours is spent, a total number of deliveries, a total number of cartons in each route or each delivery, etc.

In some implementations, the route balancing engine 636 may automatically transmit a message to one or more drivers or administrators based on the route plans and/or assignments. For instance, the route balancing engine 636 may match the routes with drivers and/or delivery vehicles based on the attributes of the routes. For example, the route balancing engine 636 may determine that a particular driver prefers (e.g., based on stored preference data, past routes or actions of the driver, etc.) routes with weighted toward distance traveled instead of quantity of addresses or cartons, and may automatically determine contact information (e.g., an e-mail address, phone number, etc.) of the driver and may transmit a message to a client device of a delivery driver or delivery vehicle assigning the driver to the route or otherwise offering the route to the driver. In another example, the route balancing engine 636 may determine that a particular route has a volume of cartons that match or are less than the capacity of a particular delivery vehicle and may automatically assign the route to the particular delivery vehicle based on the matching volume.

In some implementations, the route balancing engine 636 may automatically dispatch an automated guided vehicle, such as an automated delivery truck, aerial drone, or other robotic device, to the addresses in the route. The automated guided vehicle may execute operations based on the load plan, such as navigating through the addresses in the route and delivering the cartons associated with the addresses.

In some implementations, the route balancing engine 636 may match an automated guided vehicle to a route, instruct the automated guided vehicle to navigate to a pickup location at a delivery depot or warehouse, and then instruct the automated guided vehicle to perform the deliveries in the route. In some implementations, the route balancing engine 636 may communicate with automated guided vehicles via a robot execution controller or other system.

The route balancing engine 636 may match attributes of a particular vehicle to the attributes of the route, such as the range/distance traveled, volume of cartons, speeds attained (e.g., speeds on some roads in some routes may exceed the capability of a given vehicle), types of addresses (e.g., a flying drone or a tractor trailer truck may be incapable of delivering to downtown location or apartment building), etc.

Figure 6:
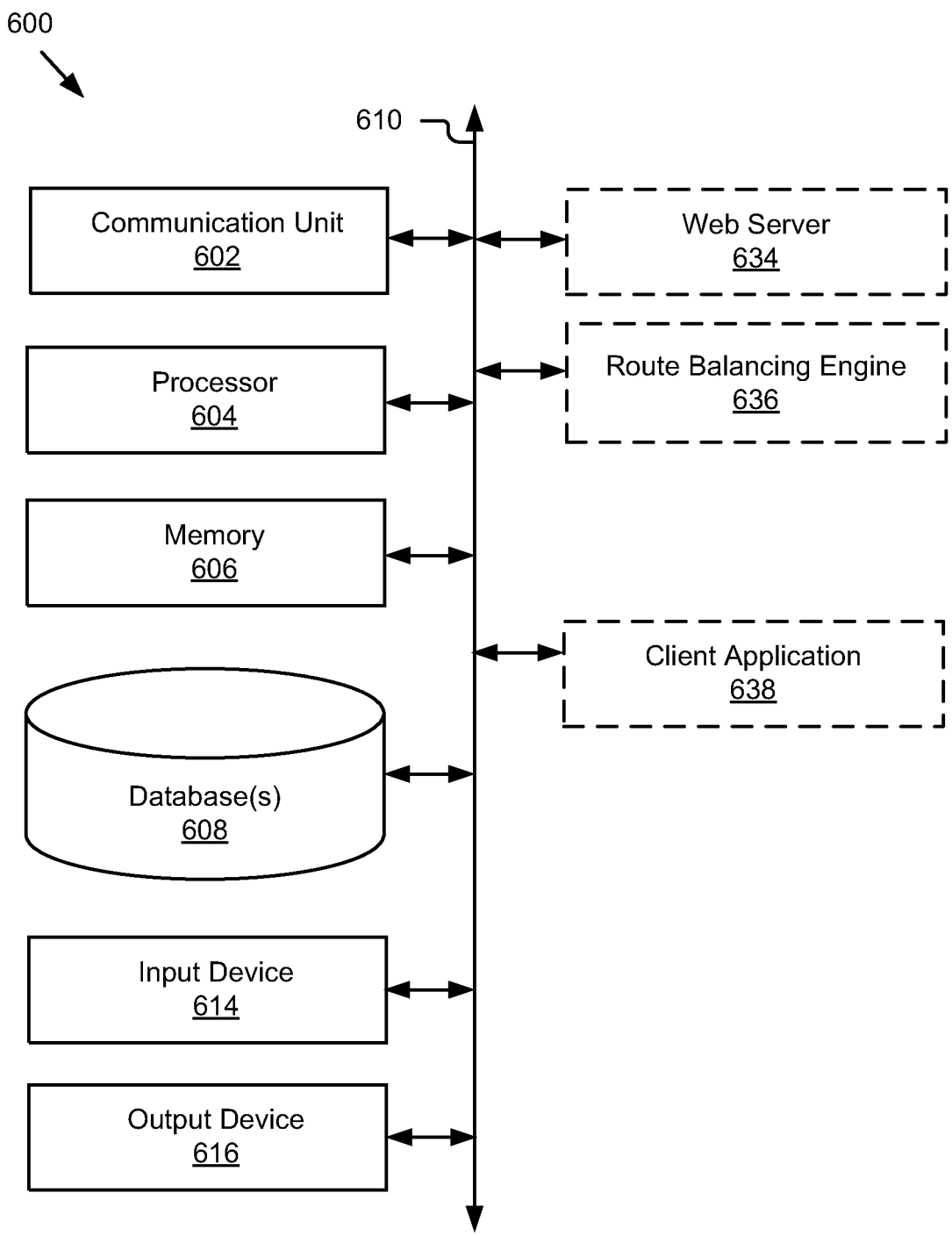
FIG. 6 is a block diagram of an example system for dynamic allocation of delivery resources.
Figure 7:
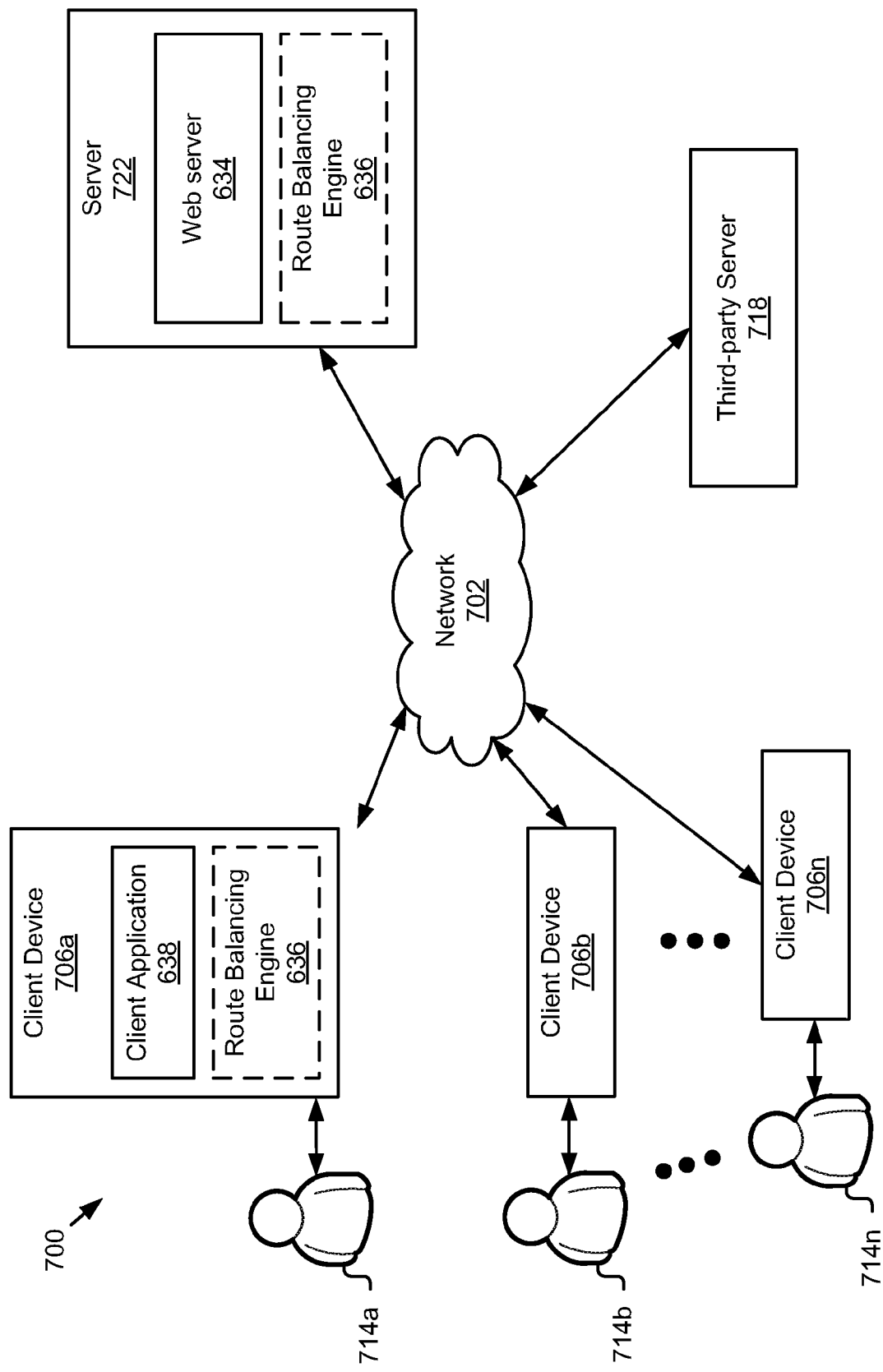
FIG. 7 is a block diagram illustrating an example computing device.

An example computing system 600 using the technology is depicted in FIG. 6. This computing system 600 may represent the computer architecture of a client device 706, a third-party server 718, and/or a server 722, as depicted in FIG. 7, and may include different components depending on the implementation being represented.

As depicted in FIG. 6, the computing system 600 may include one or more of a web server 634, a route balancing engine 636, and a client application 638, depending on the configuration. For instance, a client device 706 may include one or more of the client application 638, the route balancing engine 636, and/or components thereof, although it should be understood that other configurations are also possible, such as configurations where the client application 638 and the route balancing engine 636 are combined into a single entity or further distributed into additional components. The server 722 may include the web server 634, the route balancing engine 636, and/or components thereof, the database(s) 608, etc., although other configurations are also possible and contemplated.

The client devices 706 may also store and/or operate other software such as a client application 638, a route balancing engine 636, operating system, other applications, etc., that are configured to interact with the server 722 via the network 702.

The client device 706 includes one or more computing devices having data processing and communication capabilities. The client device 706 may couple to and communicate with other client devices 706 and the other entities of the system 700 via the network 702 using a wireless and/or wired connection. Examples of client devices 706 may include mobile phones, tablets, laptops, desktops, netbooks, server appliances, servers, virtual machines, TVs, robot controllers, delivery vehicle computing devices, etc. The system 700 may include any number of client devices 706, including client devices of the same or different type.

The web server 634 includes computer logic executable by the processor 604 to receive, process, and respond to content requests. The web server 634 may include an HTTP server, a REST (representational state transfer) service, or other suitable server type. The web server 634 may receive content requests (e.g., page requests, order requests, other requests (e.g., HTTP), etc.) from client devices 706, cooperate with the route balancing engine 636 to determine the content, retrieve and incorporate data from the database(s) 608, format the content, and provide the content to the client devices. In some instances, the web server 634 may format the content using a web language and provide the content to a corresponding client application 638 for processing and/or rendering to the user for display, although other variations are also possible.

The web server 634 may be coupled to the database(s) 608 to store retrieve, and/or manipulate data stored therein and may be coupled to the route balancing engine 636 to facilitate its operations. For example, the web server 634 may allow a user on a client device 706 to communicate with the route balancing engine 636.

The route balancing engine 636 may communicate with the web server 634 to facilitate its operations and may be coupled to the database(s) 608 to store retrieve, and/or manipulate data stored therein. For example, the route balancing engine 636 may retrieve item data from a third-party server 718 and store it in the database(s) 608.

The route balancing engine 636 may include software including logic executable by the processor 604 to perform its respective acts, although in further embodiments the route balancing engine 636 may be implemented in hardware (one or more application specific integrated circuits (ASICs) coupled to the bus 610 for cooperation and communication with the other components of the system 600; sets of instructions stored in one or more discrete memory devices (e.g., a PROM, FPROM, ROM) that are coupled to the bus 610 for cooperation and communication with the other components of the system 600; a combination thereof; etc.).

In some implementations, the route balancing engine 636 may receive as input, for example, one or more of: volume to be delivered within the delivery period; delivery depot address and delivery destination addresses; driver time matrix between the addresses; service (stop) time used at each delivery destination address; scheduled daily scheduled time per route $T^{sch}$; scheduled daily overtime time per route $OT^{sch}$; maximum scheduled daily scheduled time per route $(T^{sch})^h = T^{sch} + OT^{sch}$; vehicle capacity VC; a vehicle routing problem (VRP) solver; range of route daily route value target; and/or minimum delivery cost of a box $CpC^l$.

In some implementations, the route balancing engine 636 may provide as output, for example, one or more of: total number of routes; territory plan: an assignment of delivery area to route along with identification of delivery areas not assigned; balanced delivery vehicle load plan by route: a balanced load plan per route based on fixed and variable fees with route specific balanced load targets that is above average in that delivery market; load plan by route: the number of miles and the total scheduled time; an assignment of destinations to route; a sequence of destinations for each route.

The client application 638 includes computer logic executable by the processor 604 on a client device 706 to provide for user interaction, receive user input, present information to the user via a display, and send data to and receive data from the other entities of the system 700 via the network 702. In some implementations, the client application 638 may generate and present user interfaces based at least in part on information received from the route balancing engine 636 and/or the web server 634 via the network 702. In some implementations, the client application 638 includes a web browser and/or code operable therein, a customized client-side application (e.g., a dedicated mobile app), a combination of both, etc. Example interfaces that can be displayed by the client application 638 are shown in Figures.

As depicted, the computing system 600 may include a processor 604, a memory 606, a communication unit 602, an output device 616, an input device 614, and database(s) 608, which may be communicatively coupled by a communication bus 610. The computing system 600 depicted in FIG. 6 is provided by way of example and it should be understood that it may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. While not shown, the computing system 600 may include various operating systems, sensors, additional processors, and other physical configurations. Although, for purposes of clarity, FIG. 6 only shows a single processor 604, memory 606, communication unit 602, etc., it should be understood that the computing system 600 may include a plurality of one or more of these components.

The processor 604 may execute software instructions by performing various input, logical, and/or mathematical operations. The processor 604 may have various computing architectures to method data signals including, for example, a complex instruction set computer (CISC) architecture, a reduced instruction set computer (RISC) architecture, and/or an architecture implementing a combination of instruction sets. The processor 604 may be physical and/or virtual, and may include a single core or plurality of processing units and/or cores. In some implementations, the processor 604 may be capable of generating and providing electronic display signals to a display device, supporting the display of images, capturing and transmitting images, performing complex tasks including various types of feature extraction and sampling, etc. In some implementations, the processor 604 may be coupled to the memory 606 via the bus 610 to access data and instructions therefrom and store data therein. The bus 610 may couple the processor 604 to the other components of the computing system 600 including, for example, the memory 606, the communication unit 602, the input device 614, the output device 616, and the database(s) 608.

The memory 606 may store and provide access to data to the other components of the computing system 600. The memory 606 may be included in a single computing device or a plurality of computing devices. In some implementations, the memory 606 may store instructions and/or data that may be executed by the processor 604. For example, the memory 606 may store one or more of a web server 634, a route balancing engine 636, a client application 638, and their respective components, depending on the configuration. The memory 606 is also capable of storing other instructions and data, including, for example, an operating system, hardware drivers, other software applications, databases, etc. The memory 606 may be coupled to the bus 610 for communication with the processor 604 and the other components of computing system 600.

The memory 606 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 604. In some implementations, the memory 606 may include one or more of volatile memory and non-volatile memory (e.g., RAM, ROM, hard disk, optical disk, etc.). It should be understood that the memory 606 may be a single device or may include multiple types of devices and configurations.

The bus 610 can include a communication bus for transferring data between components of a computing device or between computing devices, a network bus system including the network 702 or portions thereof, a processor mesh, a combination thereof, etc. In some implementations, the web server 634, route balancing engine 636, client application 638, and various other components operating on the computing device 600 (operating systems, device drivers, etc.) may cooperate and communicate via a communication mechanism included in or implemented in association with the bus 610. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 602 may include one or more interface devices (I/F) for wired and wireless connectivity among the components of the system 700. For instance, the communication unit 602 may include various types known connectivity and interface options. The communication unit 602 may be coupled to the other components of the computing system 600 via the bus 610. The communication unit 602 may be electronically communicatively coupled to the network 702 (e.g., wiredly, wirelessly, etc.). In some implementations, the communication unit 602 can link the processor 604 to the network 702, which may in turn be coupled to other processing systems. The communication unit 602 can provide other connections to the network 702 and to other entities of the system 700 using various standard communication protocols.

The input device 614 may include any device for inputting information into the computing system 600. In some implementations, the input device 614 may include one or more peripheral devices. For example, the input device 614 may include a keyboard, a pointing device, microphone, an image/video capture device (e.g., camera), a touch-screen display integrated with the output device 616, etc.

The output device 616 may be any device capable of outputting information from the computing system 600. The output device 616 may include one or more of a display (LCD, OLED, etc.), a printer, a 3D printer, a haptic device, audio reproduction device, touch-screen display, etc. In some implementations, the output device is a display which may display electronic images and data output by the computing system 600 for presentation to a user 714. In some implementations, the computing system 600 may include a graphics adapter (not shown) for rendering and outputting the images and data for presentation on output device 616. The graphics adapter (not shown) may be a separate processing device including a separate processor and memory (not shown) or may be integrated with the processor 604 and memory 606.

The database(s) are information source(s) for storing and providing access to data. The data stored by the database(s) 608 may organized and queried using various criteria including any type of data stored by them, such as an address identifier, geo ID, zip code, latitude, longitude, route value, carton size, vehicle attributes, business identifier, order ID, IP address, rewards account number, item identifier, item attributes, item name, etc. The database(s) 608 may include file systems, data tables, documents, databases, or other organized collections of data.

The components 634, 636, 638, and/or components thereof (e.g., 120, 122, 124, and/or 126), may be communicatively coupled by the bus 610 and/or the processor 604 to one another and/or the other components 602, 606, 608, 614, and 616 of the computing system 600. In some implementations, the components 634, 636, and/or 638 may include computer logic (e.g., software logic, hardware logic, etc.) executable by the processor 604 to provide their acts and/or functionality. In any of the foregoing implementations, these components 634, 636, and/or 638 may be adapted for cooperation and communication with the processor 604 and the other components of the computing system 600.

The database(s) 608 may be included in the computing system 600 or in another computing system and/or storage system distinct from but coupled to or accessible by the computing system 600. The database(s) 608 can include one or more non-transitory computer-readable mediums for storing the data. In some implementations, the database(s) 608 may be incorporated with the memory 606 or may be distinct therefrom. In some implementations, the database(s) 608 may store data associated with a database management system (DBMS) operable on the computing system 600. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

FIG. 7 is a block diagram of an example system 700 for determining and implementing clustering-based demand forecasting algorithms. The illustrated system 700 may include a client device 706a....706n (also referred to herein individually and/or collectively as 706), a third-party server 718, and an server 722, which are electronically communicatively coupled via a network 702 for interaction with one another, although other system configurations are possible including other devices, systems, and networks. For example, the system 700 could include any number of client devices 706, third-party servers 718, servers 722, and other systems and devices. The client devices 706a...706n, and their components, may be coupled to the network 702. The server 722 and its components may be coupled to the network 702. The third-party server 718 and its components may be coupled to the network 702. The users 714a... 714n may access one or more of the devices of the system 700. For example, as depicted, a user 714a may access and/or interact with the client device 706a as illustrated, a user 714b may access and/or interact with the client device 706b as illustrated, and a user 714n may access and/or interact with the client device 706n as illustrated.

The network 702 may include any number of networks and/or network types. For example, the network 702 may include one or more local area networks (LANs), wide area networks (WANs) (e.g., the Internet), virtual private networks (VPNs), wireless wide area network (WWANs), WiMAX® networks, personal area networks (PANs) (e.g., Bluetooth® communication networks), various combinations thereof, etc. These private and/or public networks may have any number of configurations and/or topologies, and data may be transmitted via the networks using a variety of different communication protocols including, for example, various Internet layer, transport layer, or application layer protocols. For example, data may be transmitted via the networks using TCP/IP, UDP, TCP, HTTP, HTTPS, DASH, RTSP, RTP, RTCP, VOIP, FTP, WS, WAP, SMS, MMS, XMS, IMAP, SMTP, POP, WebDAV, or other known protocols.

A plurality of client devices 706a...706n are depicted in FIG. 7 to indicate that the server 722 and its components may services to a multiplicity of users 714a... 714n on a multiplicity of client devices 706a... 706n. In some implementations, a single user may use more than one client device 706, which the server 722 may receive and manage data associated with the user and use to perform its acts and/or functions as discussed elsewhere herein.

The server 722 and the third-party server 718 have data processing, storing, and communication capabilities, as discussed elsewhere herein. For example, the servers 722 and/or 718 may include one or more hardware servers, server arrays, storage devices and/or systems, etc. In some implementations, the servers 722 and/or 718 may include one or more virtual servers, which operate in a host server environment. As depicted, the server 722 may include the route balancing engine 636 and the web server 634, as discussed elsewhere herein.

Third-party server 718 can host services such as a third-party application (not shown), which may be individual and/or incorporated into the services provided by the server 722. In some implementations, the third-party application provides additional acts and/or information such as browsing history, tracking information, profile data, shopping data, web analytics, etc., to the server 722 for storage in the database(s) 608.

It should be understood that the system 700 illustrated in FIG. 7 is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

Methods are described herein; however, it should be understood that the methods are provided by way of example, and that variations and combinations of these methods, as well as other methods, are contemplated. For example, in some embodiments, at least a portion of one or more of the methods represent various segments of one or more larger methods and may be concatenated or various steps of these methods may be combined to produce other methods which are encompassed by the present disclosure. Additionally, it should be understood that various operations in the methods may in some cases be iterative, and thus repeated as many times as necessary generate the results described herein. Further the ordering of the operations in the methods is provided by way of example and it should be understood that various operations may occur earlier and/or later in the method without departing from the scope thereof.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

A data processing system suitable for storing and/or executing program code, such as the computing system and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices can be coupled to the system either directly or through intervening I/O controllers. The data processing system may include an apparatus may be specially constructed for the required purposes, or it may comprise a general-purpose computer selectively activated or reconfigured by a computer program stored in the computer.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects may not be mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method comprising:
    determining, by a computing device, one or more floating geographic areas from a set of geographic areas based on delivery data, the one or more floating geographic areas including one or more floating addresses located in the one or more floating geographic areas, the one or more floating addresses being separate from one or more static addresses, the one or more static addresses being statically assigned over multiple periods, the one or more floating addresses being assignable in each of the multiple periods;
    generating, by the computing device, an initial static territory-route mapping associating one or more static geographic areas with the one or more static addresses in the one or more static geographic areas;
    generating, by the computing device, one or more periodic routes based on the initial static territory-route mapping and the one or more static addresses;
    computing, by the computing device, a route-value target for each of the one or more periodic routes based on a load value of each of the one or more periodic routes;
    assigning, by the computing device, a first floating address of the one or more floating addresses to a first route of the one or more periodic routes based on the route-value target of the first route, the first floating address being located in the one or more floating geographic areas;
    generating, by the computing device, a delivery vehicle load plan based on the one or more periodic routes and the assignment of the first floating address to the first route;
    providing, by the computing device, a graphical interface indicating the one or more periodic routes; and
    automatically performing, by the computing device, one or more defined operations based on the delivery vehicle load plan, the one or more defined operations including dispatching an automated guided vehicle to execute operations based on the delivery vehicle load plan.

2. The computer-implemented method of claim 1, wherein the initial static territory-route mapping is generated for a certain time period, the one or more static geographic areas being static over the certain time period, and a periodicity of the one or more periodic routes is a subdivision of the certain time period.

3. The computer-implemented method of claim 1, further comprising:
    minimizing, by the computing device, a total number of routes in the one or more periodic routes based on a total demand of deliveries in the one or more periodic routes.

4. The computer-implemented method of claim 1, further comprising:
    determining, by the computing device, a high-touch address from among the one or more floating addresses based on attributes of the high-touch address; and
    assigning, by the computing device, the high-touch address to a second route of the one or more periodic routes.

5. The computer-implemented method of claim 1, wherein the route-value target for each route in the one or more periodic routes is based on a delivery volume and a driving distance for each route.

6. The computer-implemented method of claim 1, wherein each of the set of geographic areas corresponds to a zip code.

7. The computer-implemented method of claim 1, wherein generating the one or more periodic routes based on the initial static territory-route mapping includes running a vehicle routing problem solver to compute a particular route among addresses in a particular static geographic area of the one or more static geographic areas.

8. The computer-implemented method of claim 7, wherein computing the route-value target for each of the one or more periodic routes is based on a distance traveled in the particular route among the addresses in the particular static geographic area.

9. The computer-implemented method of claim 1, wherein assigning the first floating address to the first route is further based on a route value of the first route and includes determining the route value of the first route based on a scheduled time used for deliveries assigned to the first route.

10. A system comprising:
    a processor; and
    a non-transitory computer memory storing instructions that, when executed by the processor, cause the system to:
        determine one or more floating geographic areas from a set of geographic areas based on delivery data, the one or more floating geographic areas including one or more floating addresses located in the one or more floating geographic areas, the one or more floating addresses being separate from one or more static addresses, the one or more static addresses being statically assigned over multiple periods, the one or more floating addresses being assignable in each of the multiple periods;
        generate an initial static territory-route mapping associating one or more static geographic areas with the one or more static addresses in the one or more static geographic areas;
        generate one or more periodic routes based on the initial static territory-route mapping and the one or more static addresses;
        compute a route-value target for each of the one or more periodic routes based on a load value of each of the one or more periodic routes;
        assign a first floating address of the one or more floating addresses to a first route of the one or more periodic routes based on the route-value target of the first route, the first floating address being located in the one or more floating geographic areas;
        generate a delivery vehicle load plan based on the one or more periodic routes and the assignment of the first floating address to the first route;
        provide a graphical interface indicating the one or more periodic routes; and automatically perform one or more defined operations based on the delivery vehicle load plan, the one or more defined operations including dispatching an automated guided vehicle to execute operations based on the delivery vehicle load plan.

11. The system of claim 10, wherein
the initial static territory-route mapping is generated for a certain time period, the one or more static geographic areas being static over the certain time period, and
a periodicity of the one or more periodic routes is a subdivision of the certain time period.

12. The system of claim 10, wherein the instructions further cause the system to minimize a total number of routes in the one or more periodic routes based on a total demand of deliveries in the one or more periodic routes.

13. The system of claim 10, wherein the instructions further cause the system to determine a high-touch address from among the one or more floating addresses based on attributes of the high-touch address, and assign the high-touch address to a second route of the one or more periodic routes.

14. The system of claim 10, wherein the route-value target for each route in the one or more periodic routes is based on a delivery volume and a driving distance for each route.

15. The system of claim 10, wherein each of the set of geographic areas corresponds to a zip code.

16. The system of claim 10, wherein generating the one or more periodic routes based on the initial static territory-route mapping includes running a vehicle routing problem solver to compute a particular route among addresses in a particular static geographic area of the one or more static geographic areas.

17. The system of claim 16, wherein computing the route-value target for each of the one or more periodic routes is based on a distance traveled in the particular route among the addresses in the particular static geographic area.

18. A computer-implemented method comprising:
determining, by a computing device, a set of floating geographic areas with one or more floating addresses located in the set of floating geographic areas, the one or more floating addresses being separate from a static address, the static address being statically assigned over multiple periods, the one or more floating addresses being assignable in each of the multiple periods;
generating, by the computing device, an initial static territory-route mapping that associates a static geographic area with the static address in the static geographic area;
generating, by the computing device, a set of periodic routes based on the initial static territory-route mapping;
determining, by the computing device, a high-touch address from among the one or more floating addresses based on attributes of the high-touch address;
assigning, by the computing device, the high-touch address to a first route of the set of periodic routes;
computing, by the computing device, a route-value for at least one of the set of periodic routes;
assigning, by the computing device, a particular floating address of the one or more floating addresses to a second route of the set of periodic routes based on the route-value of the second route;
performing, by the computing device, a first defined operation based on the set of periodic routes, the assignment of the high-touch address to the first route, and the assignment of the particular floating address to the second route;
providing, by the computing device, a graphical interface indicating assignment information, the assignment information indicating one or more of the assignment of the high-touch address to the first route and the assignment of the particular floating address to the second route; and
automatically performing, by the computing device, one or more second defined operations based on the assignment information, the one or more second defined operations including dispatching an automated guided vehicle to execute operations based on the assignment information.

* * * * *